March 3, 1931.    G. DE BOTHEZAT    1,794,447
FILTER FAN
Filed Aug. 7, 1926    2 Sheets-Sheet 1

Inventor
George de Bothezat
By his Attorneys
Edwards, Sager & Bower

March 3, 1931. G. DE BOTHEZAT 1,794,447
FILTER FAN
Filed Aug. 7, 1926 2 Sheets-Sheet 2

Inventor
George de Bothezat
By his Attorneys
Edwards, Sager & Rower

Patented Mar. 3, 1931

1,794,447

UNITED STATES PATENT OFFICE

GEORGE DE BOTHEZAT, OF NEW YORK, N. Y.

FILTER FAN

Application filed August 7, 1926. Serial No. 127,820.

My invention relates to a rotary fan unit and particularly to a pressure fan unit for delivering filtered air for ventilating purposes.

Such units require a fan capable of circulating the air under pressure sufficient to pass it through a filtering means in large volume. At the same time, it is desirable to have the whole unit of convenient form and compact in overall dimensions.

The object of this invention is to provide a fan and filter unit in which all of the elements cooperate together to give the maximum service with minimum requirements of space and cost. In attaining this object I combine a filter with a fan of the disk type capable of efficiently developing high static pressures, and without sacrifice of compactness. I include in the unit an electric motor for driving the fan.

Other objects and advantages of my invention will be understood by reference to the following specification and accompanying drawings in which Fig. 1 is a sectional view of a pressure fan unit embodying the invention;

Figure 2:
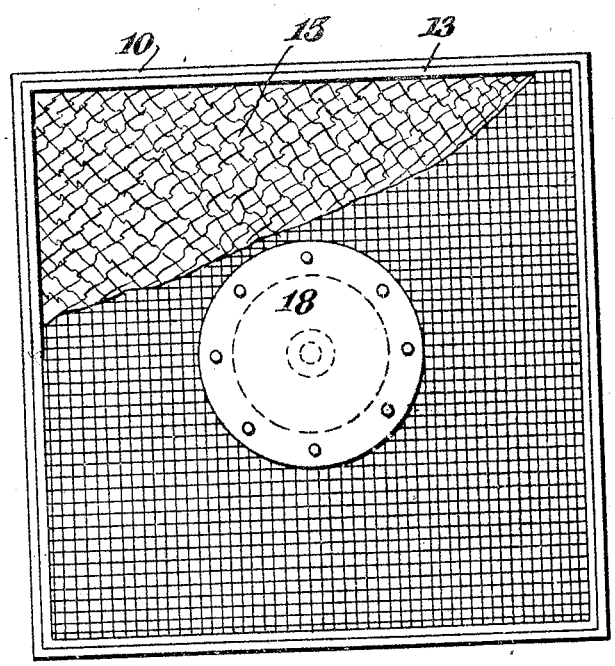
Fig. 2 is an elevation of the filter side of the fan unit.
Figure 3:
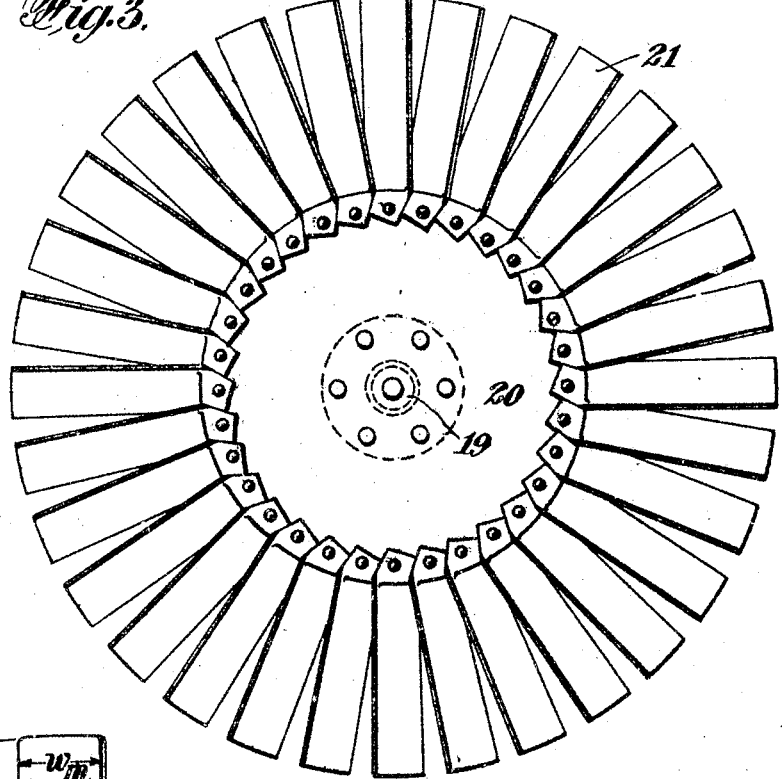
Fig. 3 is an elevation of the rotor fan of the invention.

As shown in the drawings the whole unit is contained within an outer shell or casing 10 and flat, parallel entrance and discharge surfaces E and D respectively. The shell 10 may be shaped to fit a given opening, being rectangular as shown in Fig. 2 or circular or of other desired configuration. The inlet E may be provided with a protecting screen or shutter 11 and with the filter 12 at the discharge end D, this filter fitting between the outer shell 10 and a central housing 16. The filter will comprise a suitable filtering material 15 of any desired type contained within the outer band 13 and the inner spool 14, with metal screening at each surface if desired. The filter 12 comprising the parts 13, 14 and 15 forms a separate removable unit which may be taken off, cleaned and replaced.

Between the entrance E and the filter 12 is the rotor R which in the unit of my invention is a disk type fan designed to produce a high static pressure sufficient to force the air through the resistance of the filter. This fan, as hereinafter explained, has a hub portion 19 and a central disk 20 of relatively large diameter to which are secured as by rivets, fan blades 21 so that current produced by the fan is in the form of a whirling annulus with a space S at the center. In this space is positioned an electric motor 17 carried by the central housing 16 having the arms 23 and band 22 forming a supporting frame to carry the motor and fan. The band 22 at its inner edge is formed in circular shape to receive the fan and at its outer periphery is shaped to fit within the outer shell 10. A cover plate 18 is also provided to close the end of this central space and protect the motor.

Figure 6:
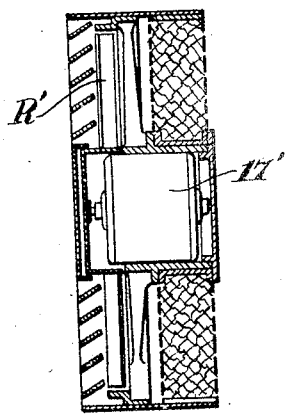
Fig. 6 is a diagrammatic view showing a modified arrangement of parts.

By thus combining a disk type of fan with the filter a very compact unit is attained and at the same time an intermediate space $s$ between the fan and filter may be left for the air currents from the fan to smooth out on the way to the filter. A still more compact assembly may be attained by positioning the rotor R' closer to the filter with the rotor overhanging the motor 17' as diagrammed in Fig. 6.

Figure 1:
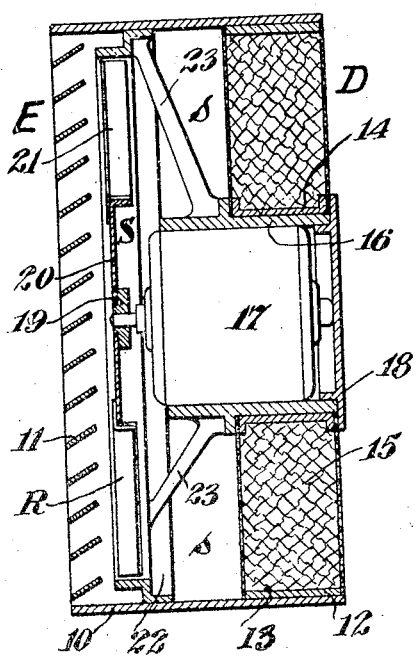
Figure 7:
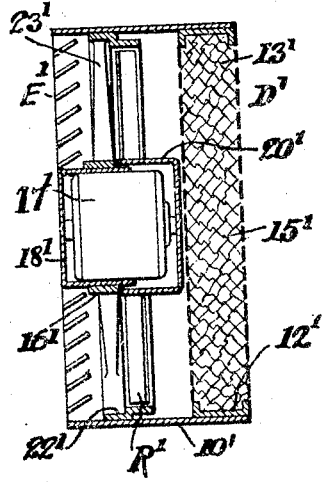
Fig. 7 is a diagrammatic view showing a further modified arrangement of parts.

In the modification shown diagrammatically in Fig. 7 the entire unit is contained within an outer shell or housing 10'. This shell or housing is provided at its inlet with a shutter E' and a filter at the discharge end D'. The removable frame 12' within the housing 10' contains the filtering material 13'. Between the shutter E' and the filter is located the rotor R' having a central cup shaped disk 20' extending over a portion of the motor 17'. The motor is supported within a central housing on framework 16' having a band 22' and extending arms 23' with a removable cover 18' extending through the shutter E' beneath the housing 16'. The disk portion 20' of the rotor is constructed so as to overhang the motor and the filter extends over the entire end of the housing 10' providing the greatest possible filtering area for the air.

In order to attain in a disk fan the pressures necessary to efficiently pass a large volume of air through the filter under the pressure required a special formation of the fan is necessary as to its width ratio, blade spacing, blade angle, aspect ratio and the size of the disk 20 from its center to the inner portions of the blades 21.

Figure 4:
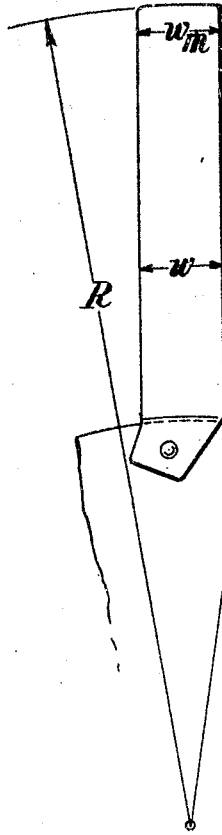
Fig. 4 is a detailed elevation of one blade.

The "width ratio" is the ratio of the width of the blades measured at any point to the circumference through the point at which the width is measured. Thus in Fig. 4, $w$ is the width of the blade, $r$ is the radius of the circle at which the width is measured, and $n$ is the number of blades, and the $$\text{width ratio} = \frac{nw}{2\pi r}$$

The quantities $r$ and $w$ are not measured at or to the extreme tip of the blade.

Figure 5:
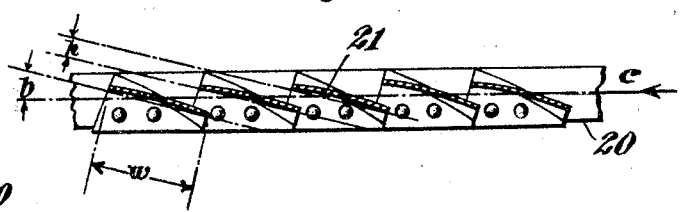
Fig. 5 is a development of the blades shown in Fig. 3.

If all the blades of the fan are cut by a cylinder of radius $r$ having for its axis the axis of the fan, a development of the blades will be had as shown in Fig. 5, and we have $$\text{blade spacing} = \frac{h}{w}$$

in which $h$=the perpendicular distance between the cords of two consecutive blade sections, $w$=the width of the blade.

The "blade angle" is the angle of the blade to the plane of rotation, for example, the angle $b$, Fig. 5, in which the arrow $c$ indicates the direction of movement and the plane of rotation.

The "aspect ratio" is the ratio of the length of the blade (from the tip to the boss) to its greatest width.

$$\text{Aspect ratio} = \frac{R}{W_m}$$

in which R=total length of blade, and $W_m$= maximum width of blade.

The size of the boss or disk is to be considered as a certain proportion of the total fan diameter.

In the course of extended investigation, theoretically and practically, it has been found that to obtain high efficiency the width ratio should be not less than 0.8 or more than 1.2 approximately, the blade angle $b$ should be not less than 15° nor more than 45°, the aspect ratio should be not less than 2.5 and may be much higher, and the blade spacing not less than one-half. The blade angle may be constant or variable from one end of the blade to the other. When the blade angle varies its minimum and maximum value should be within the limits mentioned. With the stated limits of width ratio and aspect ratio the blades turn out to be so spaced as to be not less than fifteen in number.

The investigation conducted along the lines here discussed has shown that a disk fan can only furnish a static pressure of some value with efficiency when the diameter of its disk or boss is made at least equal to or greater than approximately 0.4 of the fan diameter. With such proportioning of the disk or boss the pressure obtainable at the disk or boss is already only about 15% of that which can be obtainable at the blade tips. Therefore, the greater the static pressure to be obtained with a given angular velocity the greater must be the diameter or the greater the fan disk or boss. A fan with a disk or boss less than approximately 0.4 of the fan diameter cannot furnish at the disk or boss a pressure step of the same order of magnitude as at its tips, and the air delivered by the outer portions of the blades at higher pressure circulates backwards at the disk or boss of the fan.

It follows that beginning from the boss, the blades must have the proper shape and settings. In fans where the blades are simply secured to a flat boss and then twisted to the proper setting there will always be a section from the boss to the point where the blade has its proper setting where no pressure step will be created and the air will leak backwards during the operation of the fan. When the boss is formed with a diameter approximately 0.4, the fan diameter, pressures can be obtained to force the air forward against resistance, the characteristics of the blading being maintained within the limitations above set forth.

For an example of the foregoing principles of my invention, it has been found that a fan of 18" diameter with a boss or disk 9" diameter rotated at the relatively low speed of 1150 R. P. M. has developed 1/3" static pressure when delivering 1500 cubic feet per minute. The power absorbed by the fan is only about 1/8 H. P., which indicates the high efficiency of fans constructed in accordance with my invention.

It is to be noted that fans constructed in accordance with my invention will operate at low speeds as well as high speeds, that is, pressure will be developed at low or high speeds, the pressure, of course, increasing with increase of speed.

Rotation of the fan of my invention creates a suction and the air is drawn to it in an axial direction. The air upon passing through the fan acquires in addition to its axial motion a rotational motion given to it by the fan. The air forced through and away from the fan is a smooth flow in an axial direction with a rotational motion in all parts of the flow and is free from irregular and cross currents. The flow as it leaves the fan takes the form of a rotating mass with substantially equal axial pressures forcing the flow, and any obstruction placed within the flow will not tend to make the flow deflect backwards because any deflection of the flow at any pressure is offset by another section of the flow of equal pressure.

I claim:

1. In a ventilating unit the combination with a casing, of a disk fan capable of developing high static pressure, a shutter in front of the fan relatively close thereto, a filtering medium behind said fan relatively close thereto, and a motor for rotating said fan to draw air through the shutter and force it in a direct path through the filtering medium without the creation of backflow to any portion of the air current.

2. In a ventilating unit the combination with a casing, of a disk pressure fan having a boss, a motor for rotating said fan of a diameter substantially the same as that of the fan boss, and a filtering medium surrounding said motor spaced relatively close to said disk pressure fan.

3. In a ventilating unit the combination with a casing, of a disk pressure fan, a motor for rotating said fan, a filtering medium in said casing spaced relatively close to said fan, and a housing for said motor extending through said filtering medium and supported by said casing.

4. In a ventilating unit the combination with a casing, of a disk fan, a motor for rotating said fan, a housing for said motor supporting a fan guide, a filtering medium in said casing through which the fan forces air in straight paths to clarify the same, said fan having a boss of approximately the same diameter as the motor in order that the air from the fan will not be obstructed.

5. In a ventilating unit the combination with a casing having a shutter, of a disc fan having a boss and capable of developing high static pressure, a motor for rotating said fan contained within a housing of substantially the same diameter as the boss of said disc fan, a filtering medium supported in and by said casing surrounding said motor housing, said fan drawing air through said shutter and forcing it in a direct path through said filtering medium without creating cross currents to disturb the flow.

GEORGE DE BOTHEZAT.